Sept. 22, 1942.    M. H. HAMILTON    2,296,279
BEAM COMPASS
Filed June 17, 1941    2 Sheets-Sheet 1
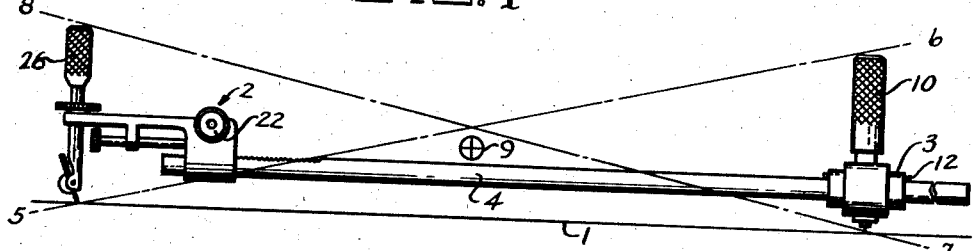
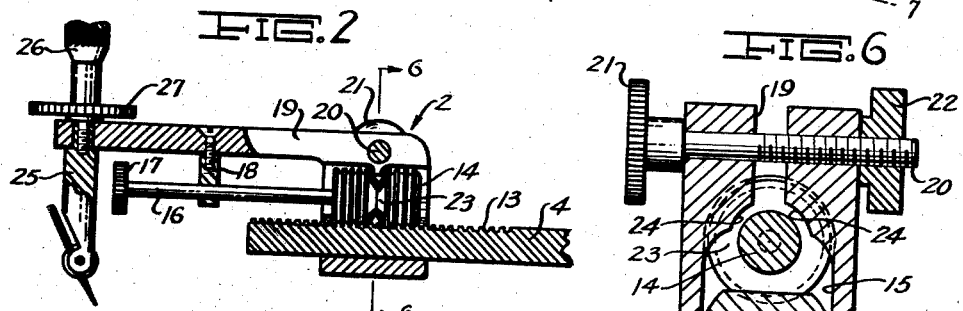
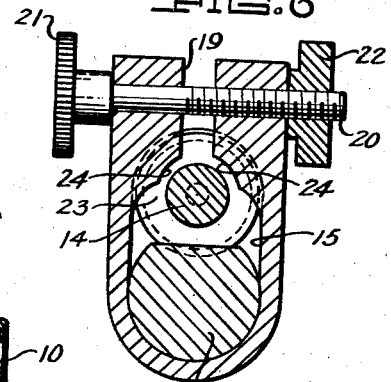
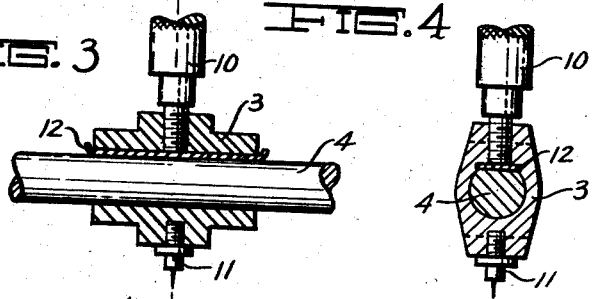
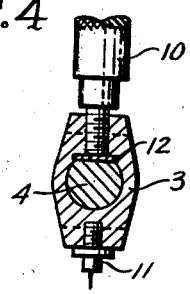
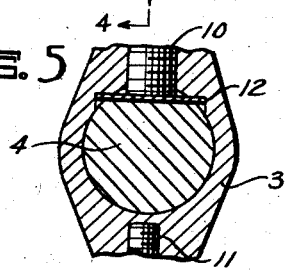
INVENTOR
MILES H. HAMILTON
BY
ATTORNEYS

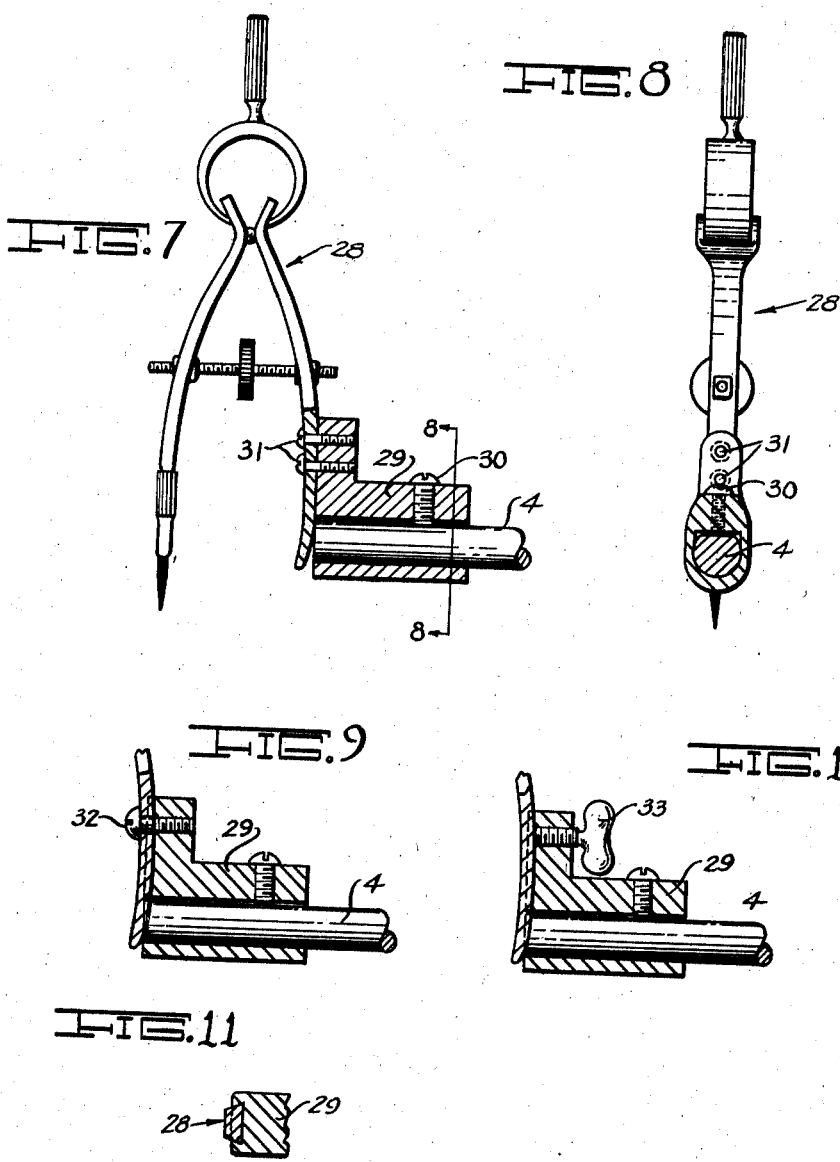

Patented Sept. 22, 1942

2,296,279

UNITED STATES PATENT OFFICE 2,296,279

BEAM COMPASS

Miles H. Hamilton, Ann Arbor, Mich.

Application June 17, 1941, Serial No. 398,441
10 Claims. (Cl. 33—159)

(Granted under the act of March 3, 1883, as
amended April 30, 1928; 370 O. G. 757)

The invention described herein may be manufactured and used by or for the Government for governmental purposes, without the payment to me of any royalties thereon.

This invention relates to a beam compass and more particularly to a beam compass of the type having a micrometer mechanism for securing a fine adjustment of the scribing element.

In all of the existing types of beam compasses with which I am familiar there is a marked tendency on the part of the instrument to rotate about its longitudinal axis and fall over on its side whenever the operator releases his hold on one of the finger pieces. This instability is due to the center of gravity of the compass lying above the natural axis of rotation of the instrument which exists when either hand is removed from its appropriate finger piece. I have recognized the cause of this tendency and have accordingly, constructed my instrument in such a way that its center of gravity is located below this axis. Hence, the source of trouble has been removed and an instrument of great stability has been evolved.

In striving to further perfect this type of compass I have devised a micrometer adjustment for the scribing head in which all lost motion may be removed and the tension on the adjusting screw adjusted by the operation of a single element of the mechanism. This novel and improved form of micrometer adjustment is not limited in its application to beam compasses alone but may be used in any mechanism or device requiring minute adjustment of one of the parts thereof. In all of the existing types of adjustments of this nature, it is impossible to remove the lost motion by mechanical interference (as distinguished from mere frictional restraint) and simultaneously to adjust the frictional tension on the micrometer screw. A possible exception is the ordinary micrometer head used in measuring instruments but here the problem is different since only two parts are involved, the head and the screw. Should a sliding part be added to these, the problem of lost motion and screw tension would immediately reappear. In my improved form of adjustment, however, it is possible to take up the end-play and adjust the tension by the manipulation of a single screw. Furthermore, the mechanism employed is simple in design and rugged in character and has no small parts or delicate mechanisms to break or get out of order.

Accordingly, one of the objects of this invention is to provide a beam compass having great lateral stability. This is accomplished by arranging the component parts of the instrument in such a way that the center of gravity of the instrument lies below the diagonal line drawn between the centering point of the instrument and the top of the finger piece of the scriber head and also below the diagonal line drawn from the scribing element to the top of the finger piece of the center carriage.

Another object of the invention is to provide a beam compass wherein the distortion due to the flexing of the beam is reduced to a minimum.

Another object of the invention is to provide a micrometer adjusting mechanism for the compass having a great range of movement.

Another object of the invention is to provide a micrometer adjusting mechanism in which the backlash may be removed and the wear taken up by means of a single adjusting screw which is simultaneously used to adjust the frictional tension on the micrometer screw.

With these and further objects in view, the invention consists of certain novel features of construction as will be more fully described and pointed out in the appended claims.

In the drawings:

Fig. 1 is a side elevation of a preferred form of my instrument showing the general arrangement of the parts and their location with regard to the surface upon which the compass is intended to scribe.

Fig. 2 is a sectional elevation of the scribing head of the instrument.

Fig. 3 is a sectional elevation of the center carriage showing the means for clamping it to the beam.

Fig. 4 is a section taken on the line 4—4 of Fig. 3.

Fig. 5 is a cross-sectional view showing the details of the means for keying the center pin carriage to the beam.

Fig. 6 is a cross-sectional view taken on the line 6—6 of Fig. 2.

Fig. 7 shows a modification of my invention in which an ordinary bow pen or bow pencil is used in place of the before-mentioned scribing head.

Fig. 8 is a sectional elevation of the supporting block for fastening the bow pen or bow pencil to the end of the beam. This section is taken on the line 8—8 of Fig. 7.

Fig. 9 is a fragmentary view in cross section showing a variation of the means for clamping the bow pen or bow pencil to the supporting block.

Fig. 10 shows a further variation of the means for clamping the bow pen to the supporting block, Fig. 11 illustrates a detail of the clamping arrangement shown in Fig. 10.

A preferred form of my invention is shown in Fig. 1 where 1 is the surface upon which the instrument is intended to scribe. As shown in this figure my improved compass is made up of three component parts, these being the scribing head 2, the center pin carriage 3, and the horizontal beam 4. An important feature of my instrument lies in the fact that its center of gravity lies below the diagonal lines 5—6 and 7—8. The center of gravity for the arrangement shown in Fig. 1 is located at 9. This arrangement has the important advantage that, if the user of the instrument relaxes his grip on the finger piece of the scribing head, there will be no tendency for the center point to kick out of the surface 1 due to tilting of the instrument about the line 5—6. Similarly with the operator holding the finger piece of the scribing head and relaxing his grip on the finger piece of the center carriage, there will be no tendency of the instrument to rotate about the line 7—8 and so lift the scribing element off of the surface 1. If the center of gravity were above the diagonal lines 5—6 and 7—8, as is customary in conventional beam compasses, the instrument will have a tendency to rotate about these diagonals when the grip on either of the finger pieces is relaxed.

The lowered center of gravity is made possible in my compass by virtue of placing the beam 4 in close proximity to the paper or other surface 1 on which the circle is to be drawn. This underslung arrangement of the beam is made possible by an improved form of micrometer adjustment for the scribing head as well as by an improved form of construction for the center pin carriage.

A further advantage arising from the lowered position of the beam lies in the fact that any bending or flexing of the beam, as a circle is being scribed, will result in less distortion of the circle than would be the case were the beam located higher off the working surface. The amount of distortion resulting from this cause will be proportional to the length of the lever arm formed by that portion of the scribing pen or pencil lying between the beam and the working surface. The lowering of the beam will, of course, reduce this lever arm and so reduce the error due to bending of the beam.

As shown in Figs. 4, 5 and 6, the beam is flatted on its upper side to enable the center pin carriage block to be keyed to it and also to form a flat surface into which the threads for the micrometer mechanism may be cut.

The details of the center pin carriage are shown in Figs. 3 and 4. As therein shown the carriage block 3 is bored longitudinally with a hole of such a size as to comfortably receive the beam for a sliding fit. The finger piece 10 is formed with screw threads on its lower end and with a knurled finger grip at its upper end. A tapped hole is provided in the top of block 3 for receiving the threaded portion, the lower extremity of which bears against a slip of spring metal 12 which is bent up at the ends so as to prevent its sliding endwise out of the center block. By rotating the finger piece 10 in a clockwise direction its lower extremity will bear down on the slip 12 and clamp the center carriage firmly to the beam 4 in any desired position along the beam. The purpose of the slip 12 is two-fold: First, it serves to key the block 3 to the beam 4; and, second, it prevents marring of the flat surface of the beam 4 by the screw of the finger piece 10 when the latter is tightened. The keying effect of the slip 12 is secured by broaching out notches in the hole through block 3 (Fig. 5) to receive the longitudinal edges of 12. Thus, the center block is prevented from rotating about the beam even though the finger piece be removed. A center pin 11 of any desirable form may be screwed or otherwise fastened in the bottom of block 3.

The details of my novel scribing head are shown in Figs. 2 and 6. As shown in Fig. 2, the beam 4 is provided on its left-hand end with rack teeth 13 which mesh with a micrometer worm 14. The teeth 13 are in the form of ordinary internal screw threads, the construction of which is equivalent to drilling a hole lengthwise through a rod, tapping this hole, and then sawing the rod lengthwise through an arc of the hole so as to leave only a fragment of the threaded area remaining. The worm 14 and the beam 4 are both accommodated within an aperture 15 milled out of the enlarged right-hand end of the scribing head. While the beam 4 is snugly fitted within this aperture for a close sliding fit, the micrometer is freely rotatable therein by virtue of its being of smaller diameter than the beam 4. As shown in Fig. 2, a shaft 16 extends from the worm 14 and is provided at its left-hand end with a knurled thumb wheel 17. By turning this wheel the worm may be rotated and the head adjusted along the beam 4. A supporting block 18 is screwed or otherwise fastened to the lower surface of the head for the purpose of supporting the shaft 16. The upper right-hand portion of the scribing head is sawed or milled out as at 19 and a thumb screw 20, having a knurled head 21, is provided for the purpose of contracting the sides of the head in order to increase the frictional tension on the micrometer screw and to take up lost motion. A lock nut 22 is provided on the right-hand end of screw 20 to maintain the setting of the screw after it has been adjusted. A deep V groove 23 in the micrometer worm co-operates with the lands or ridges 24 provided in the interior of the head. These lands are left projecting into the interior of the aperture 15 at the conclusion of the milling operation and are given an annular profile as shown in Fig. 6. The ends of the lands are left blunt in order that the corners thereof may co-operate with both sides of the V groove. Thus, by tightening the thumb screw 20, the pressure of 24 on opposite sides and above the axis of the worm will force the latter downwardly into the teeth on the beam 4 and will also tend to damp the rotation of the worm. Thus, any wear between the worm and the teeth will be taken up and the frictional tension on the micrometer screw may be adjusted. By this same adjustment any wear occurring between the lands 24 and the groove 23 or between the beam 4 and the bottom of the recess 15 may be taken up. It will be noted that this provides an extremely simple micrometer adjustment involving only three essential parts, the beam, the micrometer screw, and the head.

The two lands 24 and the two ends of the micrometer worm 14 where it fits into the screw threads in the beam 4, form the four corners of a tetrahedron. When pressure is applied at any one of these points of contact, it will be reacted at the other three points, so that the beam 4 is forced down into the bottom of the aperture 15 of the scribing head 2, which latter it contacts along the bottom of the aperture 15, but most importantly at the two ends of this aperture.

The object of this arrangement is to produce an adjustment mechanism which, by operation of one element, such as one of the lands 24, simultaneously varies the frictional load on the worm 14 for proper operation thereof and also takes up all lost motion between the parts, so that any play between parts 4 and 2 is rendered impossible by mechanical interference as distinguished from mere frictional restraint. This mechanical interference should be complete; that is, it should prevent motion in any of the six possible components, either rotation about or translation along any of the three rectangular axes. It will be seen that the arrangement herein shown and described accomplishes this result.

Relative to the scribing head 2, the beam 4 is prevented from translation along its own axis by the screw threads and in turn by the lands 24. Rotation about its axis is prevented by the keying action of the micrometer worm in the arcs of screw threads cut in the beam. Rotation of the beam about either a vertical or a horizontal transverse axis is prevented by its bearing at the two ends of the aperture 15. Translation in either of these directions is similarly prevented.

At the other end of the scribing head 2 is located a scriber 25, which is provided at its lower end with the usual thumb-screw clamp for holding a pencil lead or other scribing element. The upper end of scriber 25 is shouldered and provided with a tapped hole for receiving the threaded end of the finger piece 26. Thus, the scriber 25 may be readily removed and a different one inserted by simply unscrewing the piece 26. A knurled flange 27 is formed on the piece 26 to facilitate the clamping of the scriber 25.

It should further be observed that the form of micrometer adjusting mechanism which I have invented provides for an extremely large range of adjustment of the head along the beam. Thus, a large number of concentric circles may be drawn without stopping to change the position of the center pin carriage as has been necessary with all of the previous beam compasses with which I am acquainted. The length of traverse of my scribing head along the beam is limited by the distance between the wheel 17 and the worm 14. This distance may be increased to anything within reason by simply lengthening the head 2 and the shaft 16.

A modification of my invention is shown in Figs. 7 and 8. As there shown, a conventional bow pen or bow pencil 28 is fastened by the leg which customarily bears the center point to a block 29. This block is bored for sliding movement on the beam 4 and may be clamped securely thereto by means of a setscrew 30. Thus, by merely removing the center pin of the bow pen and drilling two holes to receive the screws 31, a simple and inexpensive scribing head having a micrometer adjustment may be had.

A variation of the means for clamping the bow pen to the block 29 is shown in Fig. 9. As there shown, the leg of the bow pen is received in a vertical slot in the block 29 having a width equal to that of the leg and the leg is then tightened in place by means of screw 32.

Still another variation in the means for clamping the bow pen to the block is shown in Fig. 10. In this case a dovetailed joint between the block and the leg of the bow pen is provided as shown in Fig. 11. It will be understood that both the dovetailed slot in the block 29 and also the dovetailed leg of the bow pen are tapered in a vertical direction with the upper end of the slot and leg wider than the lower end. The leg is pushed down into the slot until it seats therein and the thumb screw 33 is then tightened to securely fasten it in place.

Having thus described my invention and several modifications of the same, what I claim as new, and desire to secure by Letters Patent, is:

1. In an instrument of the class described having an elongated member and a head adapted for sliding movement along the length of said member, the combination of rack teeth extending substantially laterally across said member, a worm meshing with said teeth, a groove in said worm, and means integral with said head and cooperating with said groove for preventing relative movement between said head and said worm.

2. In an instrument of the class described having an elongated member and a head adapted for sliding movement along the length of said member, the combination of rack teeth extending substantially laterally across one face of said member, a worm meshing with said teeth, a V-shaped groove in said worm, and blunt projections integral with said head engaging with the sides of said groove for preventing relative movement between said head and said worm.

3. In an instrument of the class described having an elongated member and a head having an aperture for slidably receiving said member, the combination of rack teeth extending substantially laterally across one face of said member, a worm located within the aperture in said head and meshing with said teeth, a groove in said worm, and projections on said head extending into the interior of said aperture for engagement with said groove to prevent relative movement between said head and said worm.

4. In an instrument of the class described having an elongated member and a head adapted for sliding movement along the length of said member, the combination of rack teeth extending substantially laterally across said member, a worm meshing with said teeth, means on said head cooperating with said worm for preventing relative movement between said head and said worm, and means for adjusting the position of said preventing means relative to said worm whereby any wear occurring between the latter two parts may be taken up.

5. In an instrument of the class described having an elongated member and a head adapted for sliding movement along the length of said member, the combination of rack teeth extending substantially laterally across said member, a worm meshing with said teeth, a groove in said worm, means on said head cooperating with said groove for preventing relative movement between said head and said worm, and means for adjusting the position of said preventing means relative to said worm whereby any wear occurring between the latter two parts may be taken up and the frictional load on said worm may be varied.

6. In an instrument of the class described having an elongated member and a head having an aperture for slidably receiving said member, the combination of rack teeth extending substantially laterally across said member, a worm located within the aperture in said head and meshing with said teeth, means integral with said head and cooperating with said worm for preventing relative movement between said head and said worm, and means for adjusting the position of said preventing means relative to said worm whereby any wear occurring between the latter two parts may be taken up and the frictional load on said worm may be varied.

7. In an instrument of the class described having an elongated member and a head having an aperture for slidably receiving said member, the combination of rack teeth extending substantially laterally across one face of said member, a worm located within the aperture in said head and meshing with said teeth, a groove in said worm, means integral with said head and cooperating with said groove for preventing relative movement between said head and said worm, and means for adjusting the position of said preventing means relative to said worm whereby any wear occurring between the latter two parts may be taken up and the frictional load on said worm may be varied.

8. In an instrument of the class described having an elongated member and a head having an aperture for slidably receiving said member, the combination of rack teeth extending substantially laterally across one face of said member, a worm located above said member within said aperture and meshing with said teeth, a V-shaped groove in said worm, two spaced, blunt projections integral with said head and engaging with said groove on spaced sides of said worm and above its center line for the purpose of preventing relative movement between said head and said worm, and means for adjusting the position of said projections relative to said worm whereby any wear occurring between the latter two parts may be taken up, the worm may be forced down into intimate contact with said teeth, and the frictional load on said worm may be varied.

9. In an instrument of the class described having an elongated member and a head having a recessed U-shaped portion for slidably receiving said member, the combination of rack teeth extending substantially laterally across one face of said member, a worm located vertically above said member within the recess in said U-shaped portion and meshing with said teeth, a V-shaped groove in said worm, a blunt land of annular profile projecting inwardly from each side of said U-shaped portion and engaging with said groove on spaced sides of said worm and above its centerline for the purpose of preventing relative movement between said head and said worm, and means for compressing the sides of the U-shaped portion to thereby press the lands more firmly into the groove whereby any lost motion existing between the worm and the head is eliminated, the worm is forced downwardly into intimate contact with said teeth, and said member is pressed firmly against the bottom of the recess in said U-shaped portion.

10. In an instrument of the class described, the combination of a beam having a series of rack teeth formed on one end thereof, a scribing head comprised of an elongated member having a beam-receiving portion formed on one end thereof and a scribing element on the other end thereof, a worm rotatably secured in the beam-receiving portion of said head and meshing with the teeth of said beam, and a manipulative means for rotating said worm, said means including a thumb wheel located adjacent to said scribing element and a shaft connecting said wheel with said worm, whereby said worm may be moved over a considerable length of said beam before said wheel strikes the end of said beam.

MILES H. HAMILTON.